(12) United States Patent
Koskinen et al.

(10) Patent No.: US 12,104,319 B2
(45) Date of Patent: Oct. 1, 2024

(54) METHOD FOR CONTROLLING A CHEMICAL RECOVERY BOILER AND A CHEMICAL RECOVERY BOILER

(71) Applicant: VALMET AUTOMATION OY, Espoo (FI)

(72) Inventors: Jukka Koskinen, Tampere (FI); Mikko Leskinen, Nokia (FI); Jarmo Mansikkasalo, Pirkkala (FI)

(73) Assignee: VALMET AUTOMATION OY, Espoo (FI)

( * ) Notice: Subject to any disclaimer, the term of this patent is extended or adjusted under 35 U.S.C. 154(b) by 0 days.

(21) Appl. No.: 17/888,917

(22) Filed: Aug. 16, 2022

(65) Prior Publication Data

US 2023/0057366 A1    Feb. 23, 2023

(30) Foreign Application Priority Data

Aug. 17, 2021    (FI) ..................................... 20215864

(51) Int. Cl.
*D21C 11/12*    (2006.01)
*D21C 11/00*    (2006.01)
(Continued)

(52) U.S. Cl.
CPC .......... *D21C 11/12* (2013.01); *D21C 11/0007* (2013.01); *D21C 11/122* (2013.01);
(Continued)

(58) Field of Classification Search
CPC ..... D21C 11/122; G01J 5/0044; G01J 5/0037; G01J 5/004
See application file for complete search history.

(56) References Cited

U.S. PATENT DOCUMENTS 3,847,092 A    11/1974    Gilbert
5,368,471 A    11/1994    Kychakoff et al.
(Continued)

FOREIGN PATENT DOCUMENTS

CA        1166842 A       5/1984
DE        41 90 919 C2    4/1995
(Continued)

OTHER PUBLICATIONS

Tavares et al., Effect of the Char Bed Temperature and Temperature Distribution on Fume Generation in a Kraft Recovery Boiler, 1997, Engineering and Papermakers Conference. p. 1153-1158 (Year: 1997).*

(Continued)

*Primary Examiner* — Anthony Calandra
(74) *Attorney, Agent, or Firm* — Oliff PLC

(57) ABSTRACT

A method for controlling a chemical recovery boiler. The method includes measuring concentrations of sodium carbonate, sodium sulfide, and sodium sulfate from green liquor of the chemical recovery boiler, determining a target temperature for smelt, imaging at least an area of a char bed of the chemical recovery boiler, the area being close to a smelt spout, to obtain an image of the area, determining a measured temperature of the char bed using the image of the area. The method further includes determining that the measured temperature of the char bed is less than the target temperature for smelt, and controlling the chemical recovery boiler such that the temperature of the char bed increases. A chemical recovery boiler for the same.

5 Claims, 6 Drawing Sheets

(51) Int. Cl.
| | |
|---|---|
| *D21C 11/14* | (2006.01) |
| *F23G 5/50* | (2006.01) |
| *F23G 7/04* | (2006.01) |
| *G01B 11/24* | (2006.01) |
| *G01J 5/00* | (2022.01) |
| *G01N 25/04* | (2006.01) |

(52) U.S. Cl.
CPC ............... *D21C 11/14* (2013.01); *F23G 5/50* (2013.01); *F23G 7/04* (2013.01); *G01B 11/24* (2013.01); *G01J 5/0044* (2013.01); *G01N 25/04* (2013.01); *G01J 2005/0077* (2013.01)

(56) References Cited

U.S. PATENT DOCUMENTS

| | | | |
|---|---|---|---|
| 10,655,849 | B2 | 5/2020 | Mansikkasalo et al. |
| 2018/0080173 | A1* | 3/2018 | Koskinen ............. D21C 11/122 |
| 2021/0071361 | A1 | 3/2021 | Mansikkasalo et al. |
| 2022/0396918 | A1* | 12/2022 | Lappalainen ........ D21C 11/122 |

FOREIGN PATENT DOCUMENTS

| | | | |
|---|---|---|---|
| EP | 3296457 | A1 | 3/2018 |
| FI | 79622 | B | 9/1989 |
| FI | 130049 | B | 1/2023 |
| FI | 130402 | B | 8/2023 |
| JP | S63-180820 | A | 7/1988 |
| JP | H02-191785 | A | 7/1990 |
| JP | H02-300393 | A | 12/1990 |
| JP | H06-220789 | A | 8/1994 |
| JP | H06-322685 | A | 11/1994 |
| JP | 2590261 | B2 | 3/1997 |
| JP | 2971279 | B2 | 11/1999 |
| WO | 2006/048495 | A1 | 5/2006 |

OTHER PUBLICATIONS

Sathyanathan et al., Chemical Recovery boilers and recent developments, 1990, IPPTA, vol. 2 not. 3 p. 55-65 (Year: 1990).*

Honghi Tran et al.; "Effects of Sulphide on Melting Temperatures of Smelt and Carryover in Kraft Recovery Boilers"; TAPPI EPE Conference, Memphis, TN; Oct. 12-14, 2009; pp. 1-9.

Honghi Tran et al.; "The Fluidity of Recovery Boiler Smelt"; Journal of Pulp and Paper Science; Jul./Aug./Sep. 2006; vol. 32; No. 3; pp. 1-6.

Mar. 8, 2022 Office Action issued in Finnish Patent Application No. 20215864.

Mar. 29, 2023 Office Action issued in Austrian Patent Application No. A 50582/2022.

Laurila, T. et al. "Valmet Recovery Boiler Optimization", Valmet Automation Inc., 2017, pp. 1-15.

Brink, A. et al. "In-Furnace Temperature and Heat Flux Mapping in a Kraft Recovery Boiler", TAPPI Journal, 2010, pp. 7-11.

"Sintrol VULCAN12MP High Temperature Imaging System", Product Brochure, released online May 2020.

"Recovery Boiler Camera (RBC) Cost Effective Internal Combustion Inspection System", Clyde Industries, 2020.

"Valmet Visible Thermal Imaging System", Valmet Corporation, BR81819, 2019.

Tran, H. et al. "Understanding Recovery Boiler Smelt Runoff Phenomena", TAPPI Journal, vol. 14, No. 1, 2015, pp. 41-50.

Engblom, M. et al. "Recovery Boiler Char Bed Dynamics—Measurements and Modeling", International Chemical Recovery Conference, vol. 1, 2010.

"Four Methods of Fly Ash Sampling", Power, 2009, https://www.powermag.com/four-methods-of-fly-ash-sampling/.

"Boilerwatch MMP-II-SSX", The HRSG User's Group Conference, 2019.

Tavares, A. J. et al. "Effect of Char Bed Temperature and Temperature Distribution on Fume Generation in a Kraft Recovery Boiler", TAPPI Journal, vol. 81, No. 9, 1998, pp. 134-138.

Vakkilainen, E. K. "Kraft Recovery Boilers—Principles and Practice", 2005.

Jun. 3, 2024 Notice of Opposition issued against Finnish Patent No. 130402.

FactSage Software and Databases, General Information, 2001, https://factsage.com/introduction/.

Adams, T. N. et al. "Kraft Recovery Boilers, Third Edition", 2019, excerpt only.

* cited by examiner

METHOD FOR CONTROLLING A CHEMICAL RECOVERY BOILER AND A CHEMICAL RECOVERY BOILER

TECHNICAL FIELD

The invention relates to chemical recovery boilers. The invention relates to methods for controlling chemical recovery boilers. Chemical recovery boilers are used in the production of pulp to recover cooking chemicals by burning black liquor or brown liquor.

BACKGROUND

Chemical recovery boilers are used in pulp and paper industry in the production of pulp to recover cooking chemicals by burning black liquor or brown liquor. Black liquor is an intermediate product in the Kraft process (i.e. sulphate process) and brown liquor is an intermediate product in the sulphite process. In the recovery process, concentrated black liquor (in sulphate process) or brown liquor (in sulphite process) is fed through injection guns into a furnace of the recovery boiler in form of droplets. In addition, combustion air is fed to the chemical recovery boiler to enable combustion of the liquor (black or brown). When the liquor burns, heat is formed and hot flue gases are generated. In the chemical recovery boiler, heat is recovered from the flue gases first with superheaters and from the thus cooled flue gases also with economizers, which both are heat exchangers. Moreover, in boiler banks, the water heated by economizers is vaporized to form steam for the superheaters.

The chemical recovery boiler has two main tasks. First, cooking chemicals are recovered from the bottom of the chemical recovery boiler in the form of smelt. While the cooking chemicals are residues of the black liquor, the combustion of the liquor also reduces the used cooking chemical to its original form (e.g. in the Kraft process, sodium sulphate $Na_2SO_4$ is reduced to sodium sulphide $Na_2S$), which requires optimal temperature and oxygen content for the reduction process to be sufficiently effective. Second, the heat is recovered, and typically used in steam turbines operating generators to produce electricity.

Problems related to operation of a chemical recovery boiler include uneven flow of smelt, such as jellyroll smelt. Jellyroll smelt refers to smelt that does not flow from the furnace. When the jellyroll smelt starts to melt and move, it causes high amount of smelt to rapidly enter the dissolving tank thereby causing explosion. In addition, solidified smelt that flows in smelt spouts cause erosion of the smelts spouts. To reduce erosion of the smelt spouts and a risk of the explosion, the smelt should be in molten form, i.e. jellyroll smelt should not be formed. Reasons for jellyroll smelt formation include an exceptionally high melting temperature of the material in the char bed and/or a low temperature of the char bed. Uneven flow of smelt, even when jellyroll smelt is not observed imposes temperature changes to the smelt spouts. These temperature changes impose thermal stress, which shortens the life of the smelt spots. For example, smelt spouts may crack because of cyclic thermal stress.

Traditionally, the problem of Jellyroll smelt has been addressed by supplying excess primary combustion air to the furnace to have a high temperature within the furnace. However, excess primary air increases the formation of carryover, which, in general, should be avoided.

Other problems related to operation of a chemical recovery boiler include clogging of an injection gun used to feed the liquor to the furnace; as well as leakage of boiler water into the furnace.

SUMMARY

It has been found that information related to the process conditions, particularly the temperature profile within the furnace, can be obtained using a camera or cameras.

According to one aspect of the invention, problems related to jellyroll smelt can be minimized. It has been noticed the problem of jellyroll smelt is most prominent, if the jellyroll smelt forms close to a smelt spout. Thus, particularly in such an area the problem should be addressed as soon as possible. In this respect, concentrations of sodium carbonate, sodium sulfide, and sodium sulfate can be measured from green liquor of the chemical recovery boiler and using these concentrations, a target temperature for the smelt can be determined. Moreover, by imaging at least an area of the char bed of the chemical recovery boiler, an image of an area of the char bed, the area being close to a smelt spout of the chemical recovery boiler, is obtained. From the image, a measured temperature of the char bed is determined, wherein the measured temperature of the char bed represents a temperature of the area, which is close to a smelt spout. Thereafter, when it is determined that the measured temperature of the char bed is less than the target temperature for smelt, the chemical recovery boiler is controlled in such a way that the temperature of the char bed increases. This aspect of the invention is disclosed in the appended claims.

According to another aspect of the invention, problems related to clogging of an injection gun and/or leakage of boiler water into the furnace can be minimized. In this respect, an area of a char bed of the chemical recovery boiler is imaged using at least a first optical detector and a second optical detector to obtain a two-dimensional or a three dimensional spatial temperature profile of the char bed of the chemical recovery boiler. Clogging of an injection gun shows in the temperature profile as a cool spot. Moreover leakage of boiler water into the furnace shows as a cool spot. Thus, in this respect, the method comprises determining that a local temperature of the spatial temperature profile of the char bed is below a threshold, and as a response to determining that the local temperature of the spatial temperature profile of the char bed is below the threshold indicating this to an operator and/or ramping down the chemical recovery boiler for maintenance thereof and/or cleaning or maintaining an injection gun of the chemical recovery boiler or a part the injection gun. This aspect of the invention is disclosed in the appended examples.

DETAILED DESCRIPTION

Figure 1A:
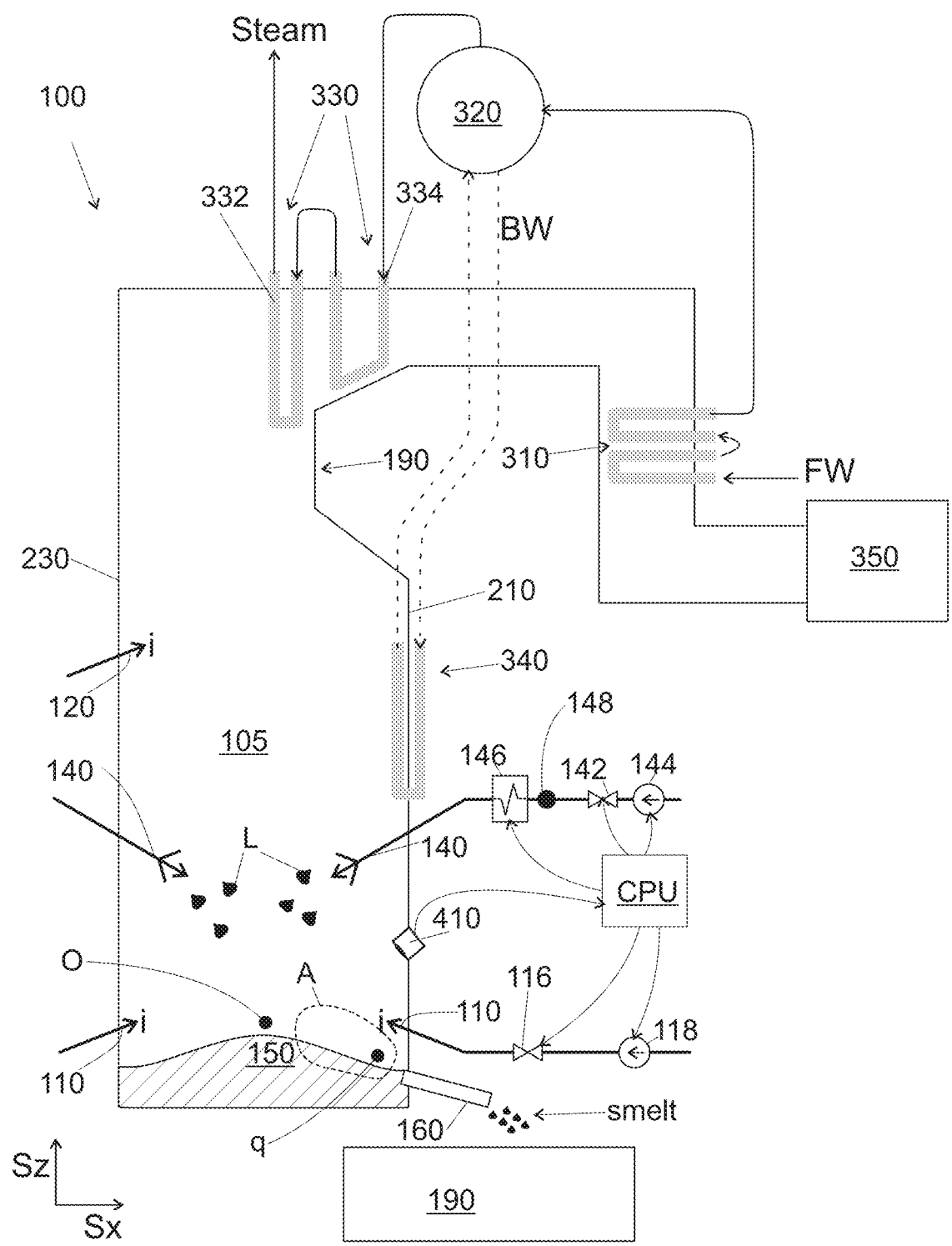
FIG. 1a shows a schematic view of a chemical recovery boiler having a camera for imaging a part of a furnace.
Figure 1B:
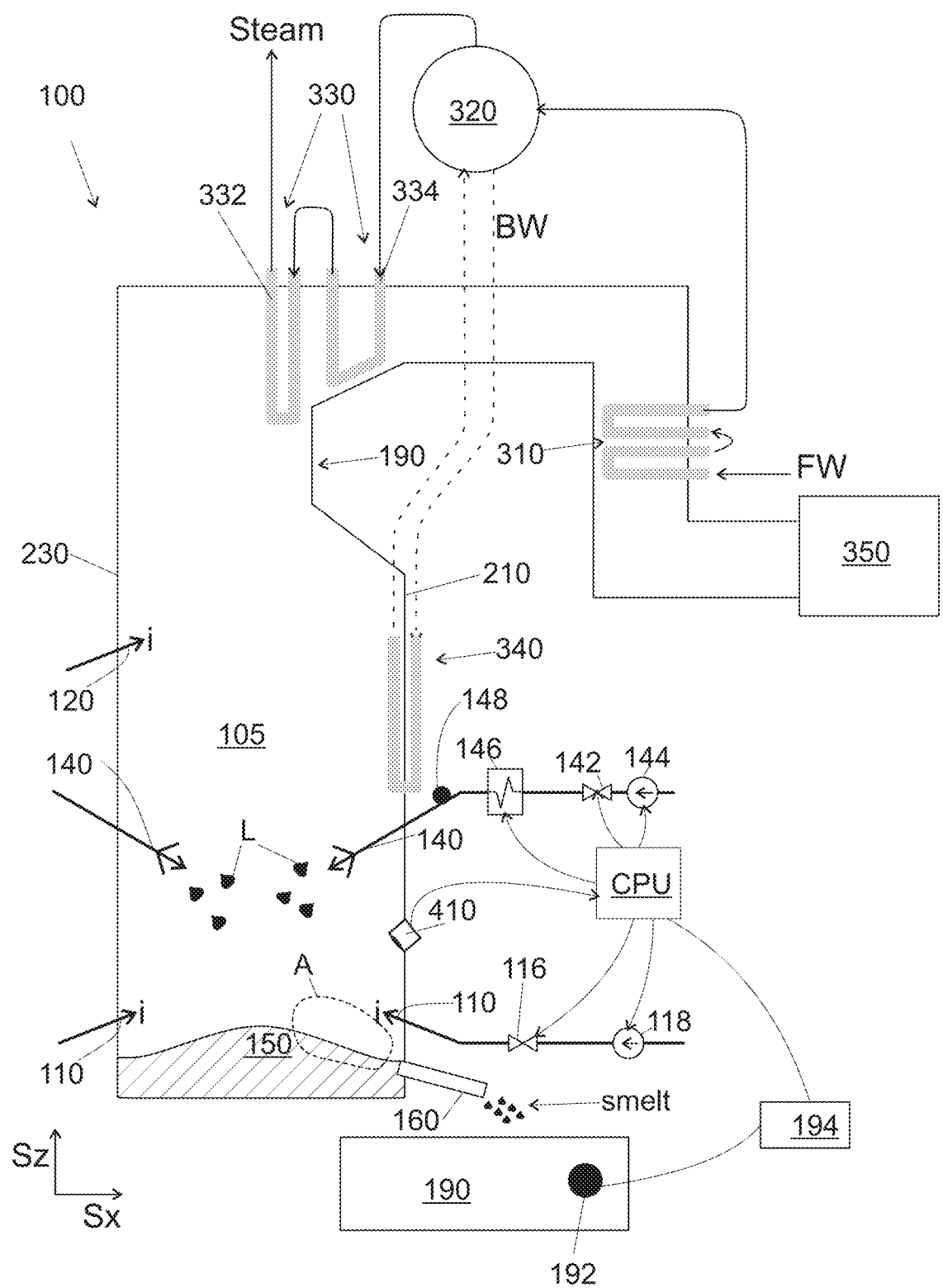
FIG. 1b shows a schematic view of a chemical recovery boiler having a camera for imaging a part of a furnace and a sensor for measuring concentrations of green liquor.
Figure 1C:
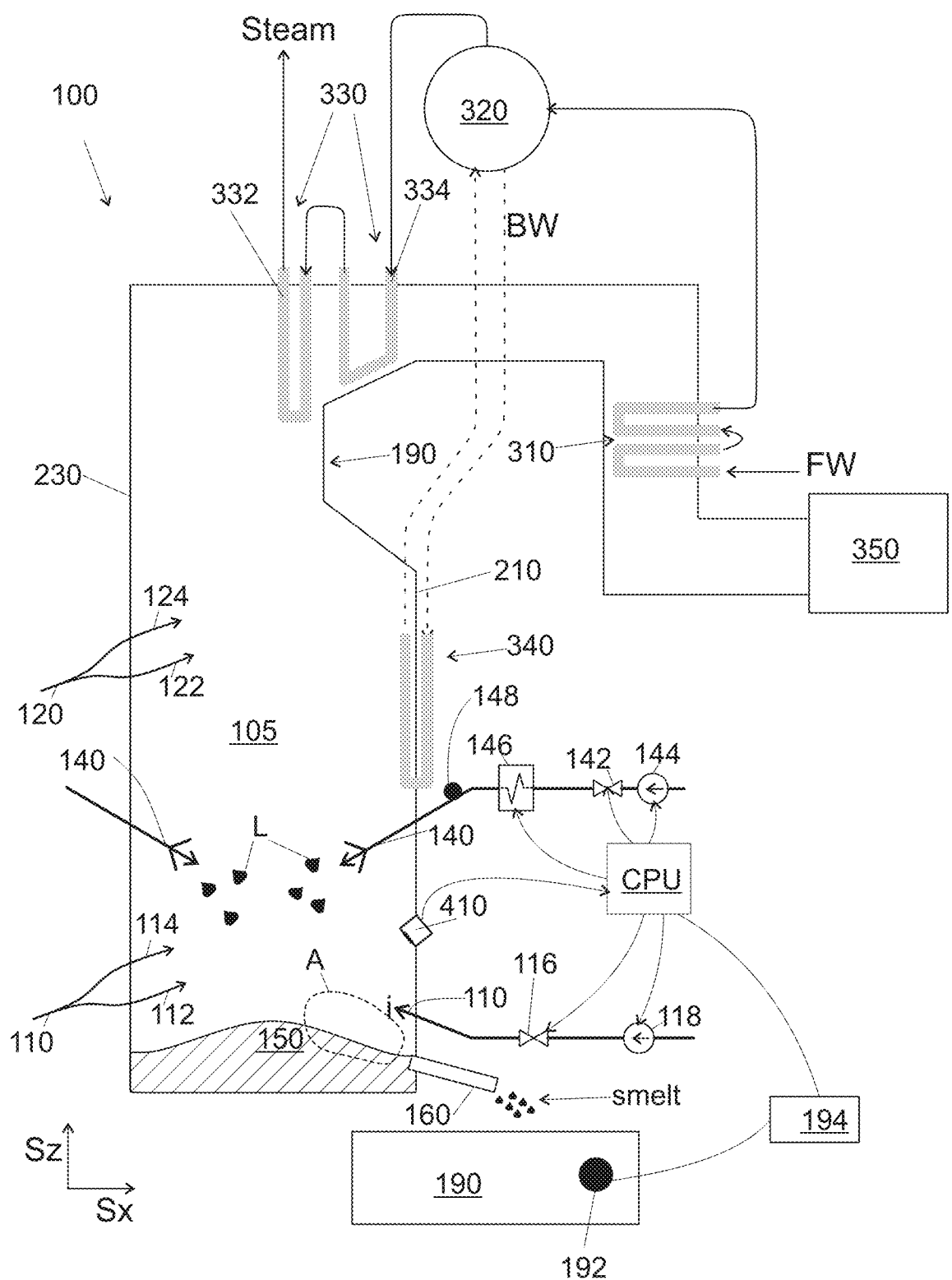
FIG. 1c shows a schematic view of a chemical recovery boiler having a camera for imaging a part of a furnace and multiple air inlets at different heights.

FIGS. 1a to 1c show a chemical recovery boiler 100. The boiler 100 is configured to burn concentrated black liquor or brown liquor to produce heat and smelt. Heat is produced by burning the concentrated black or brown liquor. The smelt forms a char bed 150 in a lower part of a furnace 105 of the chemical recovery boiler 100. The smelt is let out from the boiler 100 through smelt spouts 160 for further use as part of green liquor. The smelt is dissolved in a dissolving tank 190.

Heat is produced by burning the liquor (black/brown). The heat is recovered by heat exchanger surfaces including superheaters 330, economizers 310, and boiler banks 340, including tubes in furnace walls, and screen(s). Economizers 310 are arranged in a flue gas channel downstream from a superheater 332, 334; downstream in the direction of the flow of the flue gases. The heat may be recovered at other heat transfer surfaces such as a boiler bank 340 (e.g. a wall or a screen), too. Herein the superheaters are commonly denoted by the reference 330, while a first superheater is denoted by the reference 332. Feed water FW is fed to the economizers 310 and therefrom to a drum 320. In use, the drum contains both water and steam. Boiler water BW is guided from the drum 320 to the boiler banks 340 (optionally at least a part thereof being provided in a boiler wall and/or comprising a screen), where a part thereof is vaporized and guided back to the drum 320. Steam is guided from the drum 320 to the superheaters 330, 334, 332.

The chemical recovery boiler 100 comprises a bullnose 190, which narrows the furnace 105. At least a part of a first superheater 332 is arranged at a higher vertical level than the bullnose 190. A purpose of the bullnose 190 is to protect at least one of the superheaters 330, e.g. the first superheater 332 or a second superheater 334, from too hot radiative heat transfer and/or from direct exposure to carryover. A purpose of the bullnose 190 is to guide the flue gas flow through the superheaters 330, in particular also through the first superheater 332. For these reasons, at least a part of the first superheater 332 is arranged at a higher vertical level than the bullnose 190. The furnace 105 is limited from sides by vertical walls 210, 230. Air (i) is fed to the furnace 105 through air inlets 110, 112, 114 and through the air inlets 120, 122, 124. Some of the air inlets 110, 112, 114 are arranged below the injection guns 140 and some of the air inlets 120, 122, 124 are arranged above the injection guns 140.

In order to burn the black/brown liquor, the chemical recovery boiler 100 comprises an injection gun 140 for feeding concentrated liquor into to boiler 100. The liquor, typically concentrated black liquor, is fed to the furnace 105 typically through multiple injection guns 140. The injection gun(s) 140 form(s) droplets L of concentrated liquor within the furnace 105. Some of the droplets L fall to a bottom of the furnace 105 thereby forming a char bed 150 containing smelt. From the furnace 105, the smelt runs through a smelt spout 160 to a dissolving tank 190.

The chemical recovery boiler 100 comprises at least a first optical detector 410 such as a camera.

A first aspect of the invention is summarized in the appended claims. Concerning the first aspect of the invention and the problem related to uneven flow of smelt, including jellyroll smelt, a method for controlling a chemical recovery boiler 100 (Kraft i.e. sulphate chemical recovery boiler) comprises imaging at least an area A of a char bed 150 of the chemical recovery boiler 100 using the first optical detector 410 to obtain an image I of the area A. As indicated above, it has been noticed that the problem of uneven flow of smelt is most prominent, if the partly solidified smelt forms close to a smelt spout 160. Thus, to address particularly this aspect of the problem of flow of smelt, the area A of the char bed 150 is close to a smelt spout 160 of the chemical recovery boiler 100. As for the term "close", and with reference to FIG. 1a, the area A, which is imaged, comprises such a point q that a distance of a projection of the point q to a horizontal plane from a projection of the smelt spout 160 to the horizontal plane is less than a distance of the projection of the point q to the horizontal plane from a center O of a horizontal cross section of the furnace, wherein the horizontal cross section of the furnace forms a part of the horizontal plane. In other words, when viewed from top, the point q of the area A is located further away from the center O of the furnace than from the smelt spout 160. Reference is made to FIGS. 1a and 2b. For completeness, the horizontal plane and the cross section of the furnace are arranged at the same height as the furnace's outlet to the smelt spout 160. It is noted that the point q is typically arranged on a surface of the char bed 150 and its height may vary during operation. Moreover, the point q may be located at a higher vertical level than the smelt spout 160. In addition, the area A is inside the chemical recovery boiler 100.

The method comprises determining a measured temperature of the char bed 150 using the image I of the area A of the char bed 150, wherein the measured temperature of the char bed 150 represents a temperature of the area A. The measured temperature may be a temperature of the point q that is located further away from the center O of the horizontal cross section of the furnace than from the smelt spout 160.

As detailed above, reasons for jellyroll smelt formation include an exceptionally high melting temperature of the char bed and/or a low temperature of the char bed. Therefore, to determine that the measured temperature of the smelt is less than a melting point of the smelt, also a melting point of the smelt is determined.

Melting point of the smelt depends on the chemical composition of the smelt. In particular, when black liquor is burned, melting point of the smelt depends on contents of sodium carbonate ($Na_2CO_3$), sodium sulfide ($Na_2S$), and sodium sulfate ($Na_2SO_4$) of the smelt. As detailed above, black liquor is burned in the Kraft process. Thus, this aspect of the invention relates to controlling a chemical recovery boiler for a Kraft pulp mill. As detailed below, these contents of the smelt can be determined by measuring the concentrations of sodium carbonate, sodium sulfide, and sodium sulfate from green liquor of the chemical recovery boiler 100. Thus, the method comprises determining a target temperature for smelt using the concentrations of sodium carbonate, sodium sulfide, and sodium sulfate, as measured from green liquor. The target temperature for the smelt may be equal to a calculated melting point or it may be equal to a calculated melting point added by a safety margin. It is noted that herein the term "melting point" refers to a temperature where all the smelt is in molten form.

In any case, when the measured temperature is less than the target temperature, the risk of jellyroll smelt (and other uneven flow of smelt) increases. Therefore, an embodiment comprises determining that the measured temperature of the char bed 150 is less than the target temperature for the smelt, and controlling the chemical recovery boiler 100 such that the temperature of the char bed 150 increases. Preferably, the method comprises determining that the measured temperature at the point q of the char bed 150, which point q is closer to a smelt spout 160 than to the centre O, is less than the target temperature for the smelt, and controlling the chemical recovery boiler 100 such that the temperature of the char bed 150 increases. More precisely, the method comprises controlling the chemical recovery boiler 100 as a response to determining that the measured temperature of the char bed is less than the target temperature for smelt such that the temperature of the char bed 150 increases. Even if a skilled person is well aware of multiple ways of increasing the temperature of the char bed 150, some ways to increase the temperature will be discussed below.

The contents sodium carbonate, sodium sulfide, and sodium sulfate of the smelt may be determined from the concentrations of sodium carbonate, sodium sulfide, and sodium sulfate of the green liquor once the composition and amount of the weak white liquor fed to the dissolving tank 190 is known, as well as the amount of the smelt fed to the dissolving tank. As the composition of weak white liquor fed to the dissolving tank is known, the increase of the concentrations of sodium carbonate, sodium sulfide, and sodium sulfate due to dissolving the smelt can be determined from the concentrations of the green liquor. The amount of smelt fed to the dissolving tank can be determined e.g. by determining the flow of the weak white liquor into the dissolving tank and the flow of green liquor out of the dissolving tank (in units of mass per time). In this way, the content of sodium and sulphur in the smelt can be determined from the concentrations of the green liquor.

In an embodiment, the concentrations of sodium carbonate, sodium sulfide, and sodium sulfate of the green liquor are measured by titration. For the purpose, the chemical recovery boiler may comprise a titrimeter 194 (see FIG. 1b). In the alternative, an operator may use a titrimeter, which is not part of the chemical recovery boiler.

The chemical composition of the weak white liquor need not be accurately known. Typically the weak white liquor contains only a small amount of alkalis. In terms of total titratable alkali (TTA), the TTA of weak white liquor may be of the order of 10 g/l, while the TTA of the green liquor may be of the order of 170 g/l. Thus, deviations in the TTA of the weak white liquor are negligible compared to the TTA of the green liquor. As usual, the term total titratable alkali (TTA) refers to the total molar concentration of NaOH, $Na_2S$ and $Na_2CO_3$ of the liquor (green or weak white).

FIGS. 1a to 1c show embodiments of a chemical recovery boiler 100. Concerning a chemical recovery boiler 100 suitable for performing the method, an embodiment of a chemical recovery boiler 100 comprises a furnace 105 limited by at least one vertical wall 210, an injection gun 140 for feeding liquor L to the furnace 105 to be burnt such that a char bed 150 is formed in a lower part of the furnace 105, air inlets 110, 120 for letting in combustion air i to the furnace 105, and a smelt spout 160 configured to let out smelt from the furnace 105 to a dissolving tank 190.

As detailed in FIGS. 1a to 1c, preferably the chemical recovery boiler 100 comprises upper air inlets 120 and lower air inlets 110, such that the upper air inlets 120 are arranged above an injection gun 140 and the lower air inlets 110 are arranged below an injection gun 140. As detailed in FIG. 1c, the lower air inlets 110 may comprise primary air inlets 112 and secondary air inlets 114 such that the primary air inlets 112 are arranged below the secondary air inlets 114.

As detailed in FIG. 1c, the upper air inlets 120 may comprise tertiary air inlets 122 and quaternary air inlets 124 such that the quaternary air inlets 124 are arranged above the tertiary air inlets 122. Quaternary air is not always used. Thus, the upper air inlets may comprise only the tertiary air inlets, even if the lower air inlets comprise the primary and secondary air inlets.

In order to image the area A, the chemical recovery boiler 100 comprises a first optical detector 410 configured to obtain an image I of an area A of the char bed 150 of the chemical recovery boiler 100, wherein the area A of the char bed 150 is close to a smelt spout 160 of the chemical recovery boiler 100. What has been said about the term "close" in the context of the method applies in the context of the boiler 100.

To determine whether or not the temperature of the smelt is too low, the chemical recovery boiler 100 comprises a processor CPU. The processor CPU is configured to receive information indicative of concentrations of sodium carbonate, sodium sulfide, and sodium sulfate of green liquor arranged in the dissolving tank 190. The processor CPU is configured to receive information indicative of the image I and to determine a measured temperature of the char bed 150 using the image I of the area A of the char bed 150. The processor CPU is configured to determine a measured temperature of at least the point q of the char bed 150 using the image I of the area A of the char bed 150. As for the definition of the point q, what has been said in the context of the method applies.

The processor CPU is configured to control at least one of a feed of the liquor L and a feed of the combustion air i based on the measured temperature of the char bed 150 and the information indicative of concentrations of sodium carbonate, sodium sulfide, and sodium sulfate of green liquor arranged in the dissolving tank 190.

The chemical recovery boiler may comprise at least two smelt spouts. For example, seven smelt spouts are shown in FIG. 3b. In an embodiment, the area A of a char bed 150, which area is imaged, comprises areas close to all smelt spouts (160, 160a, 160b, 160c, 160d) of the chemical recovery boiler 100. As for the term "close", in such a case the area A comprises, for each one of the plural smelt spouts s, such a point $q_s$ that a distance of a projection of the point $q_s$ to a horizontal plane from the projection of the smelt spout s in question to the horizontal plane is less than a distance of the projection of the point $q_s$ to the horizontal plane from a center of such a horizontal cross section of the furnace that is part of the horizontal plane. In other words, when viewed from top, for each one of the smelt spouts s, at least one point $q_s$ of the area A is located further away from the center O of the horizontal cross section of the furnace than from the smelt spout s in question. For completeness, the horizontal cross section of the furnace is arranged at the same height as the smelt spouts on the average. Moreover, the area A is inside the chemical recovery boiler 100.

In an embodiment, the chemical recovery boiler 100 comprises an arrangement (192, 194) for measuring the concentrations of sodium carbonate, sodium sulfide, and sodium sulfate of green liquor arranged in the dissolving tank 190. Moreover, the processor CPU of the boiler 100 is configured to receive the information indicative of concentrations of sodium carbonate, sodium sulfide, and sodium sulfate of green liquor from the arrangement (192, 194). The arrangement may comprise a titrimeter 194 as indicated above, and a sampling apparatus 192 for taking a sample from the green liquor and conveying the sample to the titrimeter 194.

Figure 4A:
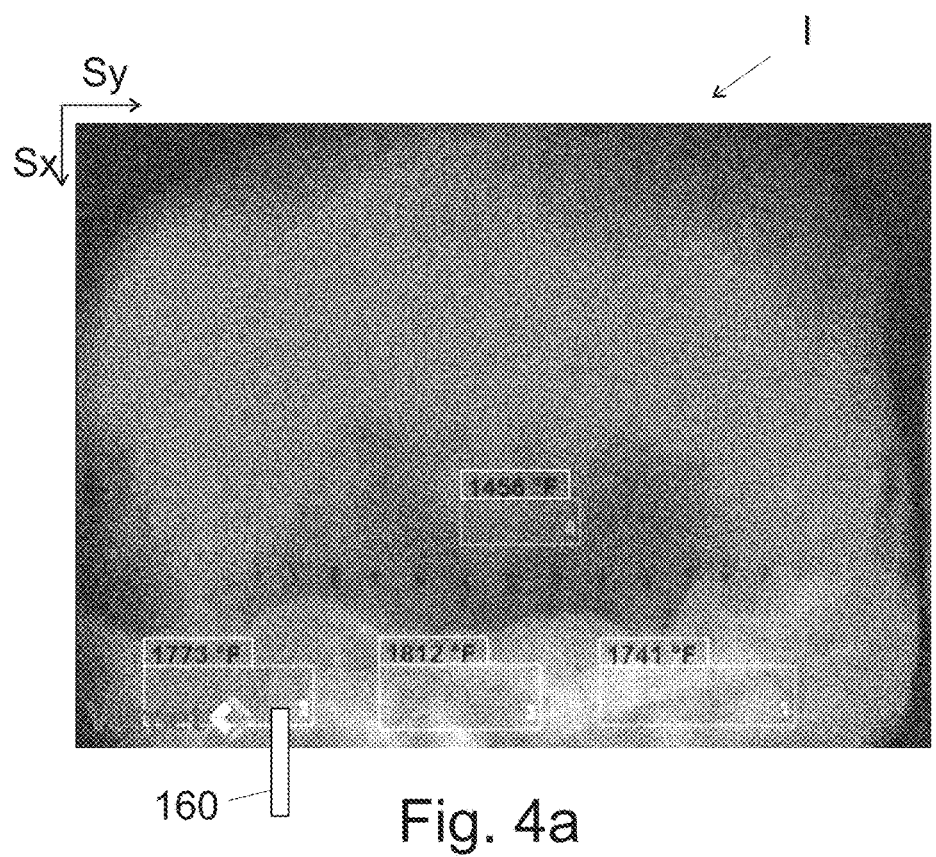
FIG. 4a shows a temperature profile measured from furnace of chemical recovery boiler.
Figure 4B:
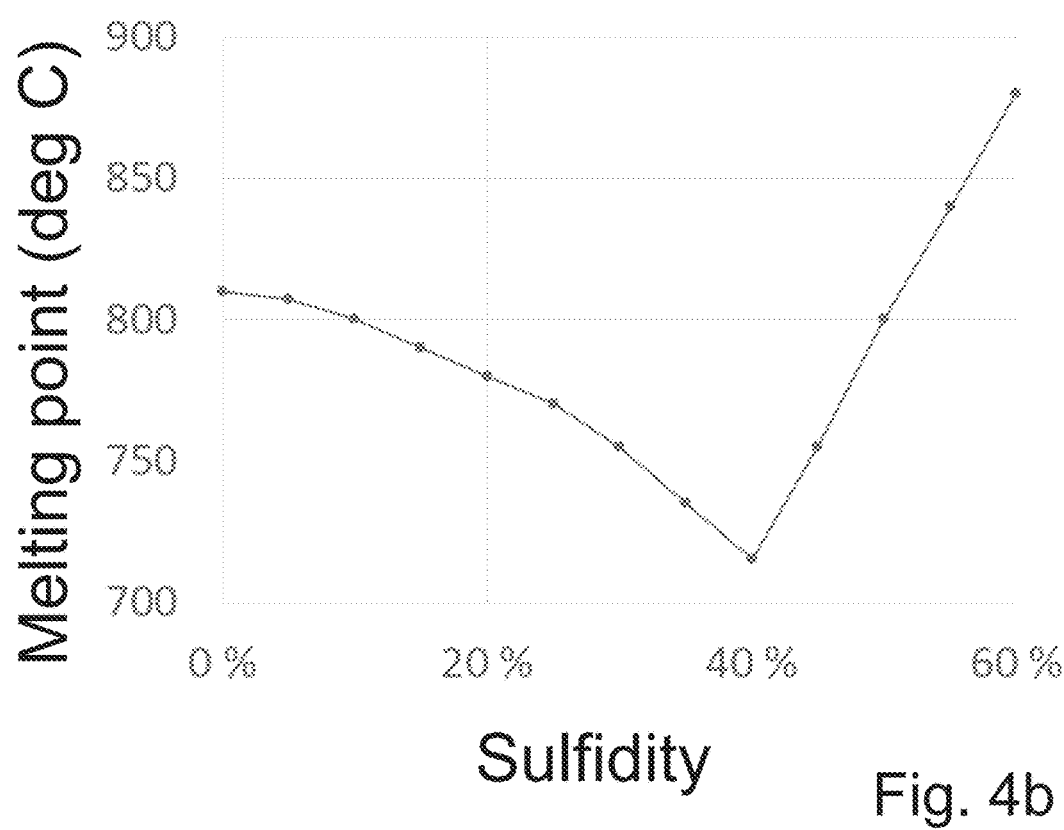
FIG. 4b shows a melting point of smelt as function of sulfidity for a known potassium content.

The melting point of the smelt depends mainly on the sulfidity of the smelt, as shown in FIG. 4b. The sulfidity of the smelt is defined as the molar ratio $Na_2S/(Na_2S+Na_2SO_4+Na_2CO_3)$. In FIG. 4b, a ratio of potassium to sodium is assumed know and constant. Already this gives a reasonably accurate estimate for the melting temperature (i.e. melting point).

However, the melting temperature (i.e. melting point) depends also on the contents of e.g. $Na_2CO_3$, $Na_2S$, $Na_2SO_4$, NaCl, $K_2CO_3$, $K_2S$, $K_2SO_4$, and KCl of the smelt; of which three first can be determined from the measured concentrations of the green liquor. The rest can be either assumed known (which provides an estimate for the melting point, not necessarily accurate) or measured (for providing a more accurate estimate for the melting point).

In principle, all the contents could be solved by analysing the composition of the black liquor. However, this is oftentimes time consuming and expensive. In the alternative, a content of Cl or K could be analysed from the green liquor. However, at least for the time being, the Cl or K content cannot be determined by titration; and other equipment for measuring the content from green liquor are not sufficiently robust and/or they are too expensive. However, it has been found that by analysing a content of Cl and K of the fly ash of the chemical recovery boiler 100, suitably accurate estimates for the contents of compounds comprising chlorine (e.g. NaCl) and potassium in isolation of chlorine (e.g. $K_2CO_3$, $K_2S$, $K_2SO_4$), and potassium in combination with chlorine (KCl) can be made. It has been found that an accuracy of an estimated melting point of the smelt can be improved by using a total content of potassium of the fly ash. The accuracy of the estimated melting point of the smelt can be further improved by calculating the contents of potassium compound(s) of the smelt from the total content of potassium of the fly ash.

Thus, an embodiment comprises collecting fly ash from the chemical recovery boiler 100, e.g. from a flue gas stream of the chemical recovery boiler and measuring a content of potassium (K) from the collected fly ash. Herein the content of potassium (K) refers to the total content of potassium in the fly ash. Thereafter, the target temperature for the smelt is determined using the concentrations of sodium carbonate, sodium sulfide, and sodium sulfate, and the content of potassium (within the fly ash). Moreover, from the content of potassium, a content of a potassium compound within the smelt can be determined, e.g. using ion balance calculations. If also a content of a potassium compound within the smelt can be determined, the target temperature for the smelt may be determined using the concentrations of sodium carbonate, sodium sulfide, and sodium sulfate, and the content of the potassium compound. The potassium compound may be one of potassium carbonate ($K_2CO_3$), potassium sulfide ($K_2S$), and potassium sulfate ($K_2SO_4$); and the contents of more than one of these the potassium compounds of the smelt can be determined. Preferably, the method comprises determining contents of a potassium carbonate ($K_2CO_3$), potassium sulfide ($K_2S$), and potassium sulfate ($K_2SO_4$) of the smelt from the content of potassium as measured from the collected fly ash, and, in the method, the target temperature for smelt is determined using the concentrations of sodium carbonate, sodium sulfide, and sodium sulfate (which are measured from green liquor), and the contents of potassium carbonate, potassium sulfide, and potassium sulfate (as determined from the total potassium content of the fly ash). More preferably the target temperature for smelt is determined using the concentrations of sodium carbonate, sodium sulfide, and sodium sulfate, and the contents of potassium carbonate, potassium sulfide, potassium sulfate, and the content of chlorine (Cl, see below). As indicated above, the target temperature may be the calculated melting point or the calculated melting point added with a safety margin.

In general, the fly ash may be collected from any location that is arranged, in the direction of flow of flue gases, downstream from the char bed 150. The fly ash may be collected e.g. from surfaces where the fly ash accumulates. Such surfaces include surfaces of a boiler bank (a wall 340 or a screen of the recovery boiler), an economizer 310, or a flue gas cleaner 350 such as an ash hopper, a filter, or an electrostatic precipitator ESP. Preferably the fly ash is collected from a flue gas cleaner, such as from an ash hopper, a filter, or an electrostatic precipitator ESP, because fly ash is removed from such a flue gas cleaner during regular operation of the chemical recovery boiler.

In general, an increase of the content of potassium (K) decreases the melting point of smelt. Reference is made to Ref. [1]. As indicated therein, also the content of chlorine (Cl) affects the melting point.

Therefore, an embodiment comprises collecting fly ash from the recovery boiler, e.g. from a flue gas stream of the chemical recovery boiler and measuring a content of chlorine (Cl) from the collected fly ash. Thereafter, the target temperature for the smelt is determined using the concentrations of sodium carbonate, sodium sulfide, and sodium sulfate, and the content of chlorine. Preferably, the target temperature for smelt is determined using the concentrations of sodium carbonate, sodium sulfide, sodium sulfate, and the contents of chlorine and the content(s) of the potassium compound(s). The content of chlorine measured from the fly ash is indicative of a content of a chlorine compound of the smelt. The chlorine compound of the smelt may be e.g. sodium chloride (NaCl) or potassium chloride (KCl).

In general, an increase of the content of chlorine (Cl) decreases the melting point of smelt. Reference is made to Ref. [1].

As for determining the chemical composition of the smelt, it is noted that the potassium and the chlorine of the black liquor ends up to the smelt and to the fly ash. Thus, by measuring the potassium and/or chlorine content of the fly ash, as detailed above, its/their content in the smelt can be determined, because the content of the black liquor is known; or at least it can be measured or estimated based on fly ash composition. However, oftentimes the potassium and chlorine contents of the black liquor remain constant for long periods of time and are the same for similar processes, whereby the content may be known from literature. Such potassium and/or chlorine that is contained by the black liquor and that does not end up to the fly ash ends up to the smelt. Thus the potassium and/or chlorine content of the smelt can be determined.

As detailed above, the more accurately the chemical composition of the smelt is known, the more accurate is the calculated melting point. Measurement of the chemical content of the smelt has been discussed above.

Thus, an embodiment comprises determining a calculated melting point of the smelt using at least the concentrations of sodium carbonate, sodium sulfide, and sodium sulfate and defining a safety margin; whereby the target temperature for smelt is determined by adding the safety margin to the calculated melting point of the smelt. The calculated melting point of the smelt may be determined by further using at least one of [i] the content of the potassium (K) compound and [ii] the content of chlorine (CI). Thus, in an embodiment the calculated melting point of the smelt is determined using the concentrations of sodium carbonate, sodium sulfide, sodium sulfate, and the content of the potassium compound, and, optionally, chlorine. Thus, in an embodiment the calculated melting point of the smelt is determined using the concentrations of sodium carbonate, sodium sulfide, and sodium sulfate, and the contents of potassium carbonate, potassium sulfide, and potassium sulfate, and, optionally, chlorine.

The safety margin may be e.g. 10° C. or 25° C.

As indicated in FIG. 4b, and also in the reference [2], one of the main parameters affecting the melting point of smelt is the sulfidity of the smelt. Herein the sulfidity of the smelt is defined as a content of sodium sulfide in the smelt divided by a total content of sodium sulfide, sodium sulfate, and sodium carbonate of the smelt. I.e. the sulfidity is expressed as $c[Na_2S]/(c[Na_2S]+c[Na_2SO_4]+c[Na_2CO_3])$, wherein the contents $c[Na_2S]$, $c[Na_2SO_4]$, and $c[Na_2CO_3]$ are the contents of sodium sulfide, sodium sulfate, and sodium carbonate, respective, expressed in the units of mol/kg.

Therefore, an embodiment comprises determining a sulfidity of the smelt using concentrations of sodium carbonate, sodium sulfide, and sodium sulfate, and determining a calculated melting point of the smelt using at least the sulfidity. The contents of sodium sulfide, sodium sulfate, and sodium carbonate in the smelt can be determined from the concentrations of sodium sulfide, sodium sulfate, and sodium carbonate in the green liquor, respectively. Principles have been presented above.

As indicated above, the method comprises controlling the chemical recovery boiler 100 such that the temperature of the char bed 150 increases. One of the key parameters affecting the temperature is the ratio of upper air to lower air. Herein the term "upper air" refers to all such air that is fed to the furnace 105 on a level that is above the injection gun(s) 140. Oftentimes the upper air includes tertiary air and quaternary air. The upper air is fed, in FIGS. 1a to 1c, through the inlet 120. When the upper air comprises tertiary air and quaternary air, the upper air is fed through multiple inlets arranged on at least two different vertical levels. For example, in FIG. 1c, tertiary air is fed through tertiary air inlets 122 and quaternary air is fed through quaternary air inlets 124. The upper air (e.g. tertiary air) may be fed through multiple inlets arranged on only one vertical level.

Herein the term "lower air" refers to all such air that is fed to the furnace 105 on a level that is below the injection gun(s) 140. Oftentimes the lower air includes primary air and secondary air. The lower air is fed, in FIG. 1c, through the inlet 110. When the lower air comprises primary air and secondary air, the lower air is fed through multiple inlets arranged on at least two different vertical levels. For example, in FIG. 1c, primary air is fed through primary air inlets 112 and secondary air is fed through secondary air inlets 114.

By decreasing the ratio of upper air to lower air (e.g. by decreasing the flow of the upper air and/or increasing the flow of lower air), the temperature of the char bed 150 tends to increase, at least when a sufficient amount of black liquor is available. In case there is a shortage of carbon, i.e. shortage of burnable material, increasing the flow of lower air may cool the char bed.

Another key parameter affecting the temperature of the char bed 150 is the amount (i.e. mass flow) of the liquor fed to the furnace. When the amount of liquor is increased, the temperature in the furnace tends to increase, as there is more fuel available, at least when there is sufficient air available for burning the fuel. Typically all the liquor coming from the evaporators is fed to the chemical recovery boiler, whereby possibilities to control a total amount of the liquor may be limited. However, the feed can be controlled locally. I.e. more liquor can be fed through such injection guns that feed liquor to cool areas of the char bed. And conversely, less can be fed to other areas. Thus, the temperature can be increased locally e.g. by increasing a flow of the black or brown liquor through an injection gun. This can be done e.g. by increasing a pressure by which the liquor is fed and/or opening a valve through which the liquor is fed to an injection gun 140 (but not to all the injection guns).

Other possibilities of increasing the temperature include:
increasing a temperature of the black liquor that is fed into the furnace of the chemical recovery boiler,
changing an angle of an injection gun through which the black liquor is fed to the furnace of the chemical recovery boiler,
increasing a flow of combustion air into the furnace,
increasing a flow of combustion air fed to a level of primary combustion air the chemical recovery boiler,
increasing a flow of combustion air through a first air inlet independent of a flow of combustion air through a second air inlet,
increasing a flow of combustion air through a first air inlet arranged at a vertical level independent of a flow of combustion air through a second air inlet arranged at the same vertical level,
increasing a temperature of combustion air
increasing a temperature of combustion air fed through a first air inlet, and
increasing a temperature of combustion air fed through a first air inlet independent of a temperature of combustion air fed through a second air inlet.

Increasing a temperature of the black liquor and/or changing an angle of an injection gun separately and in combination have the effect of changing the location in which the black liquor mainly burns. The black liquor may burn mainly as suspension (i.e. as carryover) or it may land, partly unburnt, to the char bed, wherein further oxidation takes place.

The temperature of the combustion air may be controlled e.g. by controlling a combustion air preheater (not shown). Typically, heat is recovered from flue gases to combustion air in a combustion air preheater. Heat may be transferred directly and/or through a heat transfer fluid. Recuperative and/or regenerative air preheaters can be used. In addition or alternatively, steam preheaters (i.e. combustion air preheaters heating air by steam or hot water) may be used. Typically, combustion air is heated at least with a steam preheater. Typically at least the last combustion air preheater, which is last in the direction of flow of combustion air before the furnace, is a steam operated preheater. Typically, combustion air is heated at least with such steam that is received from a steam turbine. A combustion air preheater operating with flue gas may be arranged upstream from the last heat exchanger, upstream in the direction of flow of combustion air.

For example, the flow of combustion air may be changed locally such that more combustion air is fed to locations close to the smelt spouts. If needed, simultaneously less air may be fed to other locations. This may be done only on one vertical level (e.g. primary air) or simultaneously on many different vertical levels (e.g. both primary air and secondary air). More combustion air can be fed e.g. to such locations that are close to the cool spots determined from the image I. Typically combustion air is fed to at least four different vertical levels. The air fed at these levels is oftentimes called, from bottom to top, the primary air, the secondary air, and the tertiary air. Sometimes also quaternary air is fed. If quaternary air is used, it may be fed to a level that is above the level of the tertiary air.

The feed of the air can be controlled by a baffle 116 (see FIGS. 1a to 1c). Even if not shown in the figures, separate baffles may be configured to limit the air flow to the lower air inlets 110 and the upper air inlets 120; or the primary air inlets 112, secondary air inlets 114, and tertiary air inlets 122, and optionally quaternary air inlets 124. In addition or alternatively, the air feed can be controlled by a fan or pump (commonly referred to by the reference 118) used to feed the air. Even if not shown in the figures, separate fans/pumps 118 may be configured to limit the air flow to the lower air inlets 110 and the upper air inlets 120; or the primary air inlets 112, secondary air inlets 114, and tertiary air inlets 122, and optionally quaternary air inlets 124. Moreover the processor CPU may be configured to control each one of these baffles/pumps/fans.

Concerning the temperature of the black liquor fed to the furnace, the black liquor may be fed through a heat exchanger 146 configured to heat the liquor. By controlling the heat exchange in this heat exchanger 146, the temperature of the black liquor entering the furnace can be controlled (heated or cooled, depending on the other heat exchange medium). In addition or alternatively, an electric heater or cooler can be used.

Concerning the amount of the black liquor, the flow of black liquor through an injection gun can be controlled e.g. by controlling a pump 144 configured to pump the black liquor and/or a valve 142 configured to limit the flow of black liquor. By using the valve 142 and/or the pump 144, a flow of black liquor through a certain injection gun can be stopped, if needed. The pump 144 can be configured to control the pressure, by which the black liquor is fed through the injection gun 140. In addition or alternatively, an orifice of the injection gun can be controlled in a manner similar to the valve 142. By opening the orifice, more black liquor will be fed, and by closing, less.

It has been found that the imaging of the area A can be done more accurately, when the area A is imaged by at least two optical detectors. Moreover, concerning the first aspect of the invention, regions close to all smelt spots (see FIG. 3b) is more easily imaged with at least two optical detectors (e.g. cameras) than with only one. And, concerning the second aspect of the invention, a sufficiently large area A of the char bed 150 is more easily imaged with at least two optical detectors (e.g. cameras) than with only one. Therefore, an embodiment comprises imaging the area A of the char bed 150 of the chemical recovery boiler 100 using at least a first optical detector 410 and a second optical detector 420.

Concerning the second aspect of the invention, it has also been found that when at least two optical detectors are used, the information concerning the temperature profile within the furnace 105 can be used for other purposes (alternatively or in addition). The other purposes include e.g. determining of leakage of circulating water or steam (e.g. boiler water BW) and clogging of an injection gun 140. The second aspect of the invention is summarized in the numbered examples. It is noted that since the second aspect of the invention is not related to chemical composition of the liquor (black, brown, or green), the second aspect of the invention is applicable both in a Kraft process (as the first aspect of the invention) and also in a sulfite pulping process. Thus, concerning the second aspect of the invention, the injection guns may feen brown liquor to the furnace.

Thus, an embodiment related to the second aspect comprises imaging an area A of a char bed 150 of the chemical recovery boiler 100 (either Kraft or sulphite chemical recovery boiler) using at least a first optical detector 410 and a second optical detector 420 to obtain a two-dimensional or a three-dimensional spatial temperature profile of the char bed 150 of the chemical recovery boiler 100. In the second aspect, the area A needs not be close to any one of the smelt spouts 160. However, if at least a part of the area A is close to a smelt spout 160 ("close" in the meaning defined in the context of the first aspect), in addition to what will be discussed, the temperature profile can be used to detect jellyroll smelt, or other uneven flow of smelt, as detailed above in the context of the first aspect.

The method further comprises determining that a local temperature of the spatial temperature profile of the char bed 150 is below a threshold. The fact that the local temperature is below a threshold may be indicative of clogging of an injection gun 140. If liquor is not fed through an injection gun, at that point there is nothing to burn, whereby a local temperature of the char bed 150 decreases at that point. In the alternative, if a tube of a furnace wall or a tube of a furnace screen is leaking, water drains into the furnace 105, which shows as a local temperature decrease. A correct response to the event depends on which one of the cases is at hand. How this can be determined will be discussed below.

The method comprises, as a response to determining that the local temperature of the spatial temperature profile of the char bed is below the threshold, [A] indicating to an operator an occurrence of a leakage of water and/or steam and/or ramping down the chemical recovery boiler 100 for maintenance thereof and/or [B] cleaning or maintaining an injection gun 140 of the chemical recovery boiler 100 or a part the injection gun 140.

If the reason for a low local temperature is water leakage into the furnace, the option [A] is applied. Thus, an operator may be informed an occurrence of a leakage (water and/or steam) and/or the chemical recovery boiler 100 may be ramped down for maintenance thereof. The boiler may be ramped down automatically or by the operator. If the reason for a low local temperature is clogging of an injection gun 140, the option [B] is applied.

Concerning the option [B], clogging of an injection gun 140 can be detected by determining a pressure of the liquor, which at least normally would be fed to the furnace. Thus, an embodiment comprises determining that a pressure of the black or brown liquor L configured to be fed to an injection gun 140 increases, and cleaning or maintaining the injection gun 140 or a part thereof. However, when the injection gun is completely clogged, the liquor will not be fed to the furnace through the clogged injection gun. Moreover, the pressure may be determined upstream from the injection gun, and if clogged, the black or brown liquor is not fed to the injection gun either. Thus, an embodiment comprises determining that a pressure of liquor L in a channel leading to an injection gun 140 increases, and cleaning or maintaining the injection gun 140 or a part thereof. In a corresponding manner, an embodiment of a chemical recovery boiler comprises a pressure sensor 148 configured to determine a pressure of liquor L in a channel leading to an injection gun 140. Such a pressure sensor 148 is shown in FIGS. 1a and 1b.

The injection gun 140 or the part thereof may be cleaned by an operator or automatically. Thus, an embodiment comprises indicating to an operator a need for cleaning or maintaining the injection gun 140 or a part thereof and/or automatically cleaning or maintaining the injection gun 140 or a part thereof. Concerning the "and" alternative here, even if the cleaning or maintaining is automated, the operator may be notified. If not automated, the operator may clean or maintain the injection gun after having been notified.

Concerning the option [A], boiler water leakage can be determined from [A1] mass balance of water and/or from [A2] chemical composition of water or steam. In general, mass balance of water may be indicative of leakage of steam or other water than the boiler water BW; such other water including e.g. feedwater FW. However, leakage of feedwater does not typically affect the local temperature in the furnace.

As for the option [A1], if more feed water FW is fed to the boiler than steam is taken out, at least on the average over a suitable period of time, this indicates that water or steam is leaking. Leakage in general is not always dangerous; however, boiler water leakage most often is. Moreover, if, at the same time as leakage is observed, a local temperature decease in the furnace is observed, most likely the leakage is a boiler water leakage. However, an imbalance of the water circulation alone can indicate leakage other than boiler water. Concerning the option [A1], an embodiment comprises determining that more water FW is fed to the chemical recovery boiler 100 than steam is taken out of the chemical recovery boiler 100, and indicating to an operator an occurrence of a leakage and/or ramping down the chemical recovery boiler 100. If the operator is informed of the occurrence of the leakage, the operator may undertake suitable measures, e.g. ramping down the boiler. However, the suitable measure may depend on the nature of the leakage. The operator may consider that the leakage is not so dangerous that ramping down would be needed. Ramping down the boiler, if needed, may take place automatically with or without informing the operator.

As for the option [A2], the chemical composition of the boiler water BW or the steam ("Steam") or the feed water FW may be indicative of a leakage. For example, a content of silicon (Si) or a content of sodium (Na) of the boiler water BW or the steam ("Steam") or the feed water FW typically remains constant during normal operation. However, if the content of Si or Na changes, this may be indicative of leakage of boiler water BW.

As another example, typically the pH of the boiler water BW is regulated by adding a chemical or chemicals, such as a phosphate, thereto. Moreover, the amount of the added chemical is estimated to that a content thereof in the boiler water is in a range suitable for safe operation. However, if the thus calculated amount of the added chemical does not result in the boiler water having the chemical such an amount that is within the range suitable for safe operation, this indicates leakage of boiler water.

Thus, in case there is a leakage, the leakage needs be compensated by increased amount of feed water. However, at the same time, the pH of the boiler water BW does not necessarily change as much as expected.

These methods can be used to determine that boiler water BW is leaking. Leakage of boiler water is commonly considered as a dangerous phenomenon, and most often the appropriate response is to ramp down the boiler (either automatically or by the operator after being informed).

As another example of the water composition measurements, increase of additional feedwater, which may be needed, if water is leaking, may change the chemical content of the boiler water, because the chemical content of the make-up feed water may be different from the chemical content of the boiler water.

In general, at least some of the steam, once condensed, is used as part of the feed water FW. Moreover, the steam is produced from the boiler water BW by boiling and superheating the boiler water BW. Thus, a change in the chemical composition of the boiler water BW will be observable as a change in the chemical composition of the steam as well as in the chemical composition of the feed water FW. As detailed above, as a response to any one of these events, the operator may be informed (the corresponding embodiment comprising indicating to an operator an occurrence of a leakage). In addition or alternatively, the chemical recovery boiler may be ramped down for maintenance.

Concerning the option [A2] an embodiment comprises determining a chemical composition of at least one of the boiler water BW circulating in the chemical recovery boiler 100, the feed water FW fed to the chemical recovery boiler 100, and the steam "Steam" heated in a superheater (330) of the chemical recovery boiler 100, based in the chemical content, determining that boiler water is leaking, and ramping down the chemical recovery boiler 100. As for the term "boiler water", the boiler water BW circulates in the boiling water circulations, such as furnace, screen, and other parts of boiler bank, as opposed to the feed water that is fed, optionally via economizers, to the drum.

More precisely, a content of phosphates in the boiler water has been found to be indicative of a leakage. The content of phosphates may be measured from the boiler water BW; and the amount of phosphates fed to the water may be determined. This information may be used as indicated above. It is noted that phosphates do not end up in the steam. In addition, a content of silicates and/or sodium in at least one of the steam, the boiler water BW, and the feed water FW has been found to be indicative of a leakage. Thus embodiment comprises measuring a content of a phosphate of the boiler water. In a similar way, an embodiment comprises measuring a content of a silicate or a sodium compound of at least one of the boiler water, the feed water, and steam.

For example, a decrement in the phosphate content and/or in the silicate content of the boiler water may be indicative of leakage. For example, a constant phosphate content and/or silicate content, even if the feed of phosphates and/or silicates is increased, may be indicative of leakage.

Concerning both the options [A1] and [A2], the boiler may be ramped down by an operator or automatically. In the former case, an operator may be informed of the leakage. Also, if a boiler will be ramped down automatically, an operator may be informed. Thus, an embodiment comprises indicating to an operator an occurrence of a leakage (and optionally also indicating a need for ramping down the chemical recovery boiler 100) and/or automatically ramping down the chemical recovery boiler 100.

Concerning both the aspects of the invention, if at least two optical detectors (410, 420, 430, 440) are used, they may be used such that the optical detectors (410, 420, 430, 440) are, in combination, configured to obtain the image I of the area A of a char bed 150 of the chemical recovery boiler 100. One of the optical detectors may be configured to image a part of the area A, and another of the optical detectors may be configured to image another part of the area A. This provides for a larger area A than obtainable by only one optical detector. In the alternative or in addition, one of the optical detectors may be configured to image such part of the area A that also another one of the optical detectors is configured to image the same part of the area A. This provides information related to the shape of the char bed 150, i.e. a distance of the surface of the char bed from the two optical detectors imaging the same part of the area A.

Concerning both the aspects of the invention, if two optical detectors are used, information receivable therefrom can be used more accurately, if the optical detectors are arranged apart from each other. Thus, in order to achieve accurate information concerning e.g. the distance of the imaged area from the optical detectors, preferably, the first optical detector 410 is arranged at least 1 metre apart from the second optical detector 420.

In addition or alternatively to the mutual distance between the optical detectors, more information may be obtainable, if the two optical detectors 410, 420 are arranged to image the area A from different angles. Such configurations are shown in FIGS. 2a and 2b for two optical detectors, and in FIGS. 3a and 3b for three optical detectors.

Referring to FIG. 2b, the two optical detectors 410, 420 are arranged relative to each other such that a first direction Di1 that is directed from a central point of view O of the furnace 105 of the chemical recovery boiler 100 to the first optical detector 410 forms a first angle α1 and a second angle α2 with a second direction Di2 that is directed from the central point of view O to the second optical detector 420. The directions Di1 and Di2 as well as the angles α1, α2 are shown in FIGS. 2b and 3b. The first angle α1 and the second angle α2 are defined such that the first angle α1 is smaller than the second angle α2. As detailed above, preferably, the two optical detectors 410, 420 are arranged to image the area A from different angles. More specifically, preferably, the first angle α1 is at least 20 degrees.

Figure 2A:
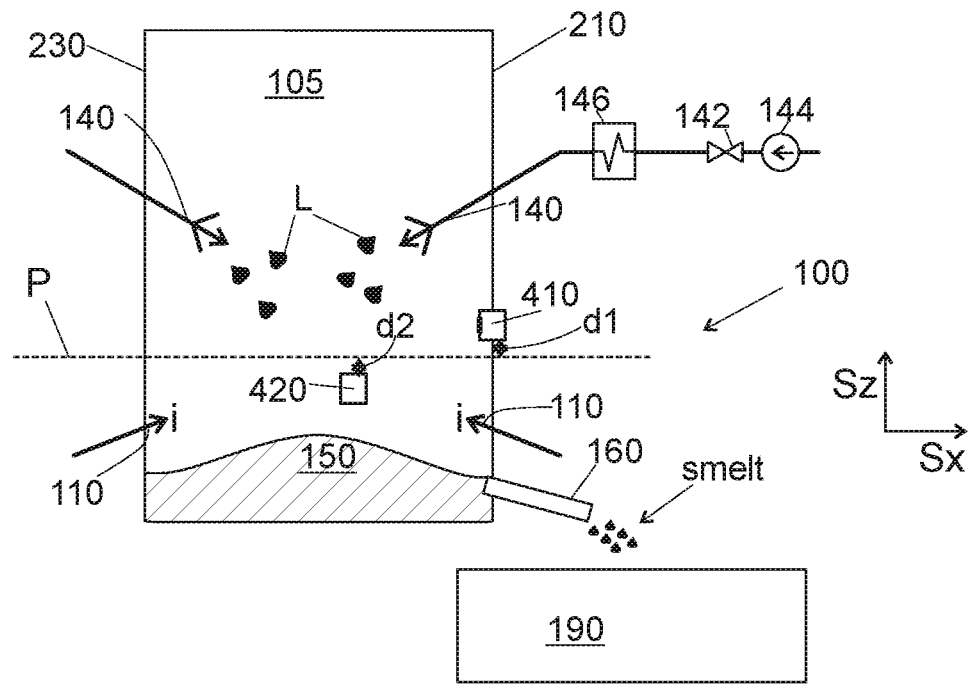
FIG. 2a shows a schematic side view of a chemical recovery boiler having two cameras for imaging a part of a furnace.
Figure 2B:
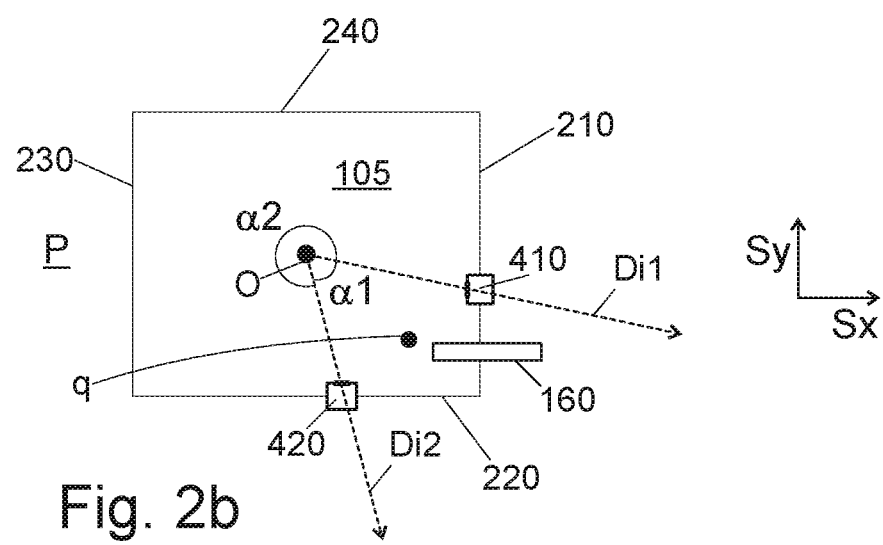
FIG. 2b shows a schematic top view of a chemical recovery boiler having two cameras for imaging a part of a furnace.
Figure 3A:
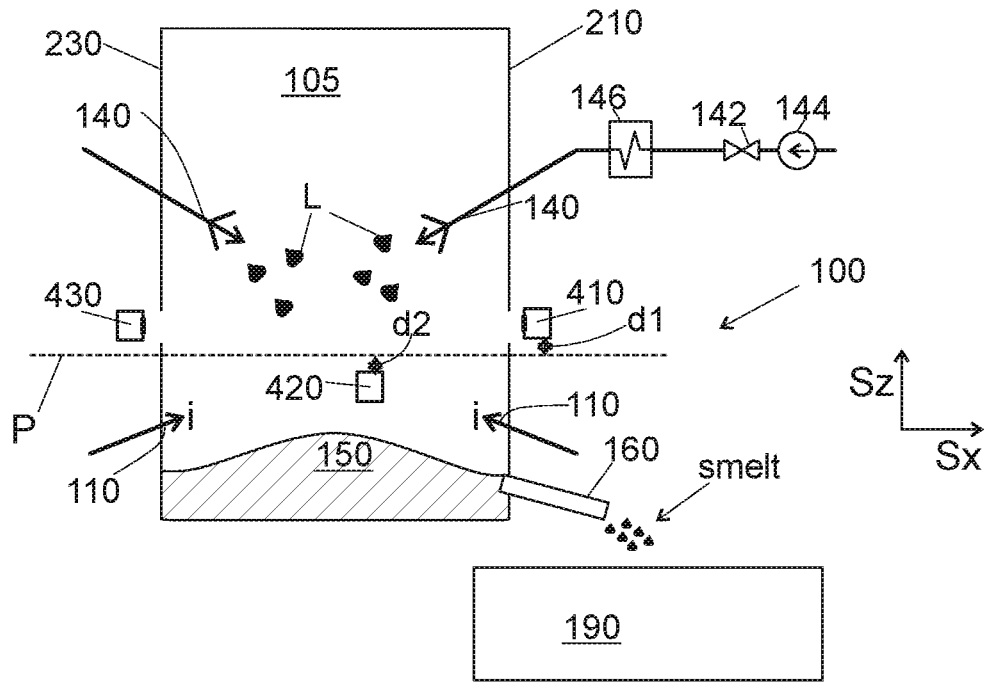
FIG. 3a shows a schematic side view of a chemical recovery boiler having four cameras for imaging a part of a furnace.
Figure 3B:
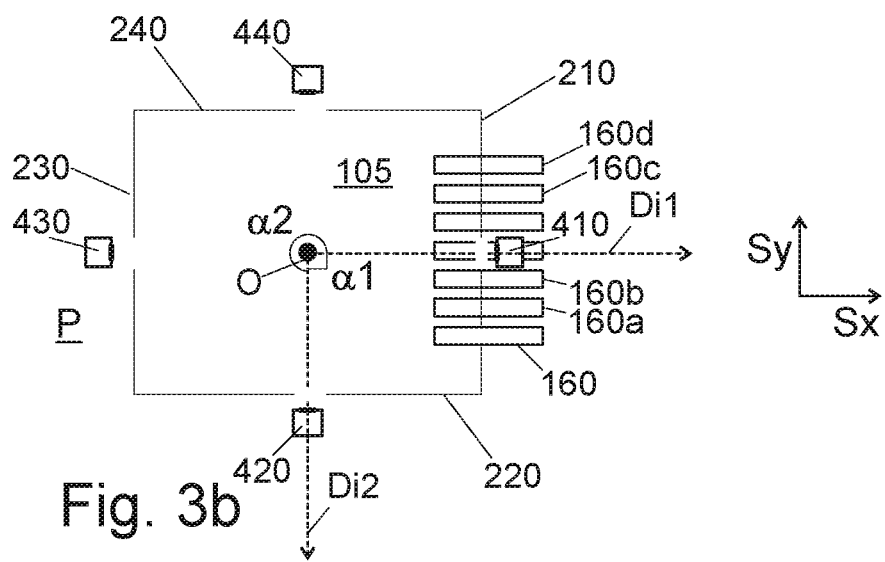
FIG. 3b shows a schematic top view of a chemical recovery boiler having four cameras for imaging a part of a furnace.

Herein the central point of view O of the furnace is a center of a horizontal cross section of the furnace 105, the cross section being comprised by a horizontal plane P, as shown in FIGS. 2a, 2b, 3a, and 3b. Referring to FIGS. 2a and 3a, the central point of view O of the furnace is a center of the horizontal cross section of the furnace 105. The horizontal plane P that comprises the cross section is arranged at such a vertical level, that the larger (max(d1,d2)) of the distance d1 from the first optical detector 410 to the horizontal plane P and the distance d2 from the second optical detector 420 to the horizontal plane P is minimized. For example, if the optical detectors 410, 420 are at the same vertical level, as they preferably are, the plane P is such a plane that both the distances d1, d2 are zero. As another example, if the optical detectors 410, 420 are not at the same vertical level, as in FIGS. 2a and 3a, the plane P is a plane that is arranged in the middle between the detectors 410, 420. Even if the detectors 410, 420 are preferably at the same vertical level, FIG. 2a shows a different embodiment for purpose of illustrating the distances d1 and d2.

In principle, a cross section of the furnace 105 could be circular or oval, whereby the furnace 105 would be limited by only one vertical wall. However, typically the furnace 105 is limited by four planar vertical walls such that a cross section of the furnace 105 is quadrangular (or more typically a rectangle, to be more precise). When the furnace is limited by at least two walls, preferably an optical detector is arranged on each one of the walls or to image the area A through each one of the walls. The wall may be provided with an aperture or a window for imaging purposes. This typically ensures that the area A is imaged from two different angles (as detailed above), and also the detectors are easily arranged a distance apart from each other (as detailed above).

For these reasons, in an embodiment, the furnace 105 of the chemical recovery boiler 100 is limited by a first vertical wall 210 and a second vertical wall 220, wherein a normal of the first vertical 210 wall is perpendicular to a normal of the second vertical wall 220. Preferably the walls 210, 220 are planar; or at least such parts of the walls 210, 220 that define the normals of the walls 210, 220, are planar and substantially vertical. In such a case, preferably, the first optical detector 410 is arranged to image the char bed 150 through the first vertical wall 210 and/or is arranged on the first vertical wall 210 and to image the char bed 150. Concerning the former, a window or an aperture can be provided to the first vertical wall 210. Concerning the latter, a window can be provided to the wall 210, and the first optical detector 410 may be arranged on the window, outside the furnace 105. In the alternative, the optical detector 410 can be arranged on the wall 210, inside the furnace 105, at least if sufficiently cooled. Moreover, preferably, the second optical detector 420 is arranged to image the char bed 150 through the second vertical wall 420 and/or is arranged on the second vertical wall 420 and to image the char bed 150. What has been said about the locations of the first optical detector 410 applies mutatis mutandis to the second optical detector 420. Such configurations are shown in FIGS. 2a, 2b, 3a, and 3b.

In principle, the shape of the cross section of the furnace could be a polygon, such as a triangle, a parallelogram, or hexagonal. In such cases, the normal of the first vertical 210 wall needs not be perpendicular to a normal of the second vertical wall 220. However, the first wall 210 and the second wall 220 do not belong to the same plane. The walls 210, 220 may be parallel, but if they are parallel, they are arranged a distance apart from each other in a direction of normal of the wall 210. Preferably, the walls 210, 220 are arranged at an angle relative to each other, whereby they do not belong to the same plane.

Preferably, even more optical detectors are used. Referring to FIG. 3b, an embodiment comprises imaging the area A of the char bed 150 of the chemical recovery boiler 100 using also a third optical detector 430. In FIG. 3b, the furnace 105 of the chemical recovery boiler is limited by a third vertical wall 230 that is parallel to the first vertical wall 210. Moreover, the third optical detector 430 is arranged to image the char bed through the third vertical wall 230 and/or is arranged on the third vertical wall 230.

Referring to FIG. 3b, an embodiment comprises imaging the area A of the char bed 150 of the chemical recovery boiler 100 using also a fourth optical detector 440. In FIG. 3b, the furnace 105 of the chemical recovery boiler is limited by a fourth vertical wall 240 that is parallel to the second vertical wall 220. Moreover, the fourth optical detector 440 is arranged to image the char bed through the fourth vertical wall 240 and/or is arranged on the fourth vertical wall 240.

Concerning both aspects of the invention, it is beneficial to obtain information concerning the spatial temperature distribution of the char bed 150. The spatial temperature distribution is referred herein to as a two-dimensional temperature profile. Thus, the two-dimensional temperature profile is the temperature of the surface of the char bed 150, as projected onto a horizontal plane of the furnace 105. In other words, the two-dimensional temperature profile is the temperature of the surface of the char bed, as viewed from top. A two-dimensional temperature profile is determinable by a single optical detector 410, such as a camera. However, if more optical detectors are used, a larger area A can be imaged. When two-dimensional temperature profile is obtained, the location(s) of the cool spots of the char bed 150 can be accurately detected.

Concerning in particular the first aspect of the invention (jellyroll or other uneven flow of smelt), it may be beneficial to obtain information concerning the shape of the char bed 150, too. For example, a high char bed 150, of which temperature is low (i.e. below the target temperature and/or below a calculated melting point) can be much more dangerous for the operation than a small char bed. Therefore, an embodiment comprises determining a shape of the char bed 150 using the images obtained by the first optical detector 410 and the second optical detector 420. The shape of the char bed may be determined without determining simultaneously a temperature profile of thereof. The shape may be determined by a processor CPU of the chemical recovery boiler 100.

However, preferably also a temperature profile, in addition to the shape, is determined. To obtain information concerning also the shape of the char bed, a three-dimensional temperature profile can be determined using information from at least two optical detectors (410, 420). As readable from above, in order to determine a distance of an imaged point of the area from the optical detectors, at least two optical detectors are needed. Thus, for this embodiment, at least two optical detectors are needed. The spatial distribution of height and temperature of the char bed 150 is herein referred to as a three-dimensional temperature profile. Thus, the three-dimensional temperature profile is the temperature of the surface of the char bed, the surface being a three-dimensional object. Thus, the three-dimensional temperature profile is the distribution of local height and surface temperature of the char bed 150, as spatially distributed over a horizontal cross-section of the furnace 105. Correspondingly, an embodiment comprises determining a shape and a spatial temperature profile of the char bed 150 using the images obtained by the first optical detector 410 and the second optical detector 420. Both the shape and the spatial temperature profile (i.e. the spatial distribution of the combination of height and temperature) may be determined by a processor CPU of the chemical recovery boiler 100.

As detailed above, a preferable embodiment comprises determining a two-dimensional or a three-dimensional temperature profile of the char bed 150.

Moreover, concerning particularly the second aspect of the invention (water leakage and/or clogging of an injection gun), preferably, the area A covers a large part of the char bed 150. Preferable embodiments are such that the area A covers at least 50% of the chard bed 150, at least 75% of the chard bed 150, or the whole char bed 150. This may be useful also in the context of the first aspect (i.e. jellyroll or other uneven flow of smelt), since the char bed may be in solid form also in regions further away from the smelt spouts 160.

Naturally, both the first and second aspects of the invention may be used in the context of a chemical recovery boiler. Thus, when the risk of solidifying smelt is determined as detailed above, in addition, water leakage and/or clogging of an injection gun 140 can be determined as disclosed above, and vice versa.

REFERENCES

[1]: Hongi Tran, Xiaosong Mao, and Patrice Chartrand: "Effects of sulphide on melting temperatures of smelt and carryover in Kraft recovery boilers" in TAPPI EPE Conference, Memphis, TN, Oct. 12-14, 2009; downloadable from Researchgate.net.

[2]: H. N. Tran, A. Sunil, and A. K. Jones: "The Fluidity of Recovery Boiler Smelt" in Journal of Pulp and Paper Science, Vol. 32, No. 3, July/August/September 2006.

The Following Examples Summarize One Aspect of an Invention

1. A method for controlling a chemical recovery boiler (100), the method comprising
   imaging an area (A) of a char bed (150) of the chemical recovery boiler (100) using at least a first optical detector (410) and a second optical detector (420) to obtain a two-dimensional or a three-dimensional spatial temperature profile of the char bed (150) of the chemical recovery boiler (100),
   determining that a local temperature of the spatial temperature profile of the char bed (150) is below a threshold, and
   as a response to determining that the local temperature of the spatial temperature profile of the char bed is below the threshold:
   indicating to an operator an occurrence of a leakage and/or
   ramping down the chemical recovery boiler (100) for maintenance thereof and/or
   cleaning or maintaining an injection gun (140) of the chemical recovery boiler (100) or a part the injection gun (140).
2. The method of example 1, comprising
   determining that a pressure of liquor (L) fed to an injection gun (14) increases, and
   cleaning or maintaining the injection gun (140) or a part thereof.
3. The method of example 2, comprising
   indicating to an operator a need for cleaning or maintaining the injection gun (140) or a part thereof and/or
   automatically cleaning or maintaining the injection gun (140) or a part thereof.
4. The method of any of the examples 1 to 3, comprising
   determining that more water (FW) is fed to the chemical recovery boiler (100) than steam is taken out of the chemical recovery boiler (100), and
   indicating to an operator an occurrence of a leakage and/or
   ramping down the chemical recovery boiler (100).
5. The method of any of the examples 1 to 4, comprising
   determining a chemical composition of at least one of [i] the boiler water (BW) circulating in the chemical recovery boiler (100), [ii] the feed water (FW) fed to the chemical recovery boiler (100), and [iii] the steam (Steam) heated in a superheater (330) of the chemical recovery boiler (100),
   based on the chemical content, determining that boiler water (BW) is leaking, and
   indicating to an operator an occurrence of a boiler water (BW) leakage and/or
   ramping down the chemical recovery boiler (100).
6. The method of the example 4 or 5, comprising
   indicating to an operator a need for ramping down the chemical recovery boiler (100) and/or
   automatically ramping down the chemical recovery boiler (100).

7. The method of any of the examples 1 to 6, wherein the first optical detector (410) is arranged at least 1 metre apart from the second optical detector (420).
8. The method of any of the examples 1 to 7, wherein
a first direction (Di1) that is directed from a central point of view (O) of a furnace (105) of the chemical recovery boiler (100) to the first optical detector (410) forms a first angle (a1) and a second angle (α2) with a second direction (Di2) that is directed from the central point of view (O) to the second optical detector (420), wherein
the first angle (a1) is smaller than the second angle (α2), the first angle (a1) is at least 20 degrees, and
the central point of view (O) of the furnace is a center of a horizontal cross section of the furnace (105).
9. The method of any of the examples 1 to 8, wherein
a furnace (105) of the chemical recovery boiler (100) is limited by a first vertical wall (210) and a second vertical wall (220), wherein
the first vertical (210) wall and the second vertical wall (220) do not belong to the same plane,
the first optical detector (410) is arranged to image the char bed (150) through the first vertical wall (210) and/or is arranged on the first vertical wall (210), and
the second optical detector (420) is arranged to image the char bed (150) through the second vertical wall (420) and/or is arranged on the second vertical wall (420);
preferably,
a normal of the first vertical wall (210) is perpendicular to a normal of the second vertical wall (220).
10. The method of example 9, comprising
imaging the area (A) of a char bed (150) of the chemical recovery boiler (100) using also a third optical detector (430);
preferably
the furnace (105) of the chemical recovery boiler is limited by a third vertical wall (230) that is parallel to the first vertical wall (210), and
the third optical detector (430) is arranged to image the char bed through the third vertical wall (230) and/or is arranged on the third vertical wall (230).
11. The method of any of the examples 1 to 10, wherein
the area (A) covers at least 50% of the char bed (150);
preferably, the area (A) covers the whole char bed (150).
12. A chemical recovery boiler, comprising
a furnace (105) limited by at least one vertical wall (210),
an injection gun (140) for feeding liquor (L) to the furnace (105) to be burnt such that a char bed (150) is formed in a lower part of the furnace (105),
air inlets (110) for letting in combustion air (i) to the furnace (105),
a smelt spout (160) configured to let out smelt from the furnace (105) to a dissolving tank (190),
a detector arrangement (400) comprising a first optical detector (410) and a second optical detector (420), the detector arrangement (400) being configured to obtain an image (I) of an area (A) of a char bed (150) of the chemical recovery boiler (100),
a processor (CPU) that is configured to
receive information indicative of the image (I),
determine a two-dimensional or a three-dimensional spatial temperature profile of the area (A) of the char bed (150) using the information of the image (I), determine that a local temperature of the spatial temperature profile of the char bed (150) is below a threshold, and
indicating to an operator that the local temperature is below a threshold, and/or control at least an actuator to perform at least one of: ramping down the chemical recovery boiler (100), cleaning an injection gun or a part thereof, or maintaining an injection gun or a part thereof.
13. The chemical recovery boiler (100) of example 12, comprising
a pressure sensor (148) configured to determine a pressure of the liquor (L) in a channel leading to the injection gun (140).
14. The chemical recovery boiler (100) of the example 12 or 13, comprising
cleaning equipment configured to clean the injection gun (140);
preferably,
the processor (CPU) is configured to receive a signal from the pressure sensor (148) and to engage the cleaning equipment as a response to determining that the local temperature of the spatial temperature profile of the char bed (150) is below a threshold and to the signal from the pressure sensor.

The invention claimed is:
1. A method for controlling a chemical recovery boiler that is configured to burn black liquor or brown liquor to produce smelt, wherein the smelt forms a char bed in a furnace of the chemical recovery boiler and is let out from the furnace through at least two smelt spouts, the method comprising:
imaging an area of the char bed to obtain an image of the area, wherein the area of the char bed consists of areas close to the at least two smelt spouts;
determining a measured temperature of the areas close to the at least two smelt spouts using the image of the area of the char bed, wherein the measured temperature of the areas close to the at least two smelt spouts represents an average temperature of the areas close to the at least two smelt spouts;
determining whether the measured temperature of the areas close to the at least two smelt spouts is less than a target temperature; and
controlling the chemical recovery boiler such that the average temperature of the areas close to the at least two smelt spouts is higher than the target temperature, wherein:
the average temperature of the areas close to the at least two smelt spouts is an average of measured temperatures at points q, each point q being located further away from a center O of the furnace than from a corresponding one of the at least two smelt spouts in a horizontal cross section of the furnace, and
the target temperature is a melting temperature of the smelt calculated using the concentrations of sodium carbonate, sodium sulfide, and sodium sulfate in the smelt.
2. The method of claim 1, wherein the imaging is performed by a plurality of optical detectors comprising at least a first optical detector and a second optical detector.
3. The method of claim 2, comprising determining a spatial temperature profile of the char bed using the images obtained by the first optical detector and the second optical detector.

4. The method of claim 2, wherein the first optical detector is arranged at least 1 meter apart from the second optical detector.

5. The method of claim 2, wherein in the horizontal cross section of the furnace:
- a first direction extends from the center O of the furnace to the first optical detector,
- a second direction extends from the center O of the furnace to the second optical detector,
- the first direction forms a first angle and a second angle with the second direction, and
- the first angle is at least 20° and is not greater than the second angle.

* * * * *